United States Patent [19]
Schilling et al.

[11] 3,952,939
[45] Apr. 27, 1976

[54] SHEET CLADDING METHOD

[75] Inventors: William F. Schilling, Schenectady; Adrian M. Beltran, Ballston Lake; Gerald E. Wasielewski, Rexford, all of N.Y.

[73] Assignee: General Electric Company, Schenectady, N.Y.

[22] Filed: July 28, 1975

[21] Appl. No.: 599,630

[52] U.S. Cl. ............................................. 228/193
[51] Int. Cl.² ........................................ B23K 19/00
[58] Field of Search .......... 228/173, 139, 193, 212, 228/233, 234, 235, 236, 237

[56] References Cited
UNITED STATES PATENTS

| | | | |
|---|---|---|---|
| 3,235,958 | 2/1966 | Gauthron | 228/193 X |
| 3,699,642 | 10/1972 | Lange | 29/497.5 |
| 3,736,638 | 6/1973 | Stone | 228/233 X |
| 3,815,219 | 3/1971 | Wilson | 228/193 |

*Primary Examiner*—Al Lawrence Smith
*Assistant Examiner*—Margaret Joyce
*Attorney, Agent, or Firm*—John F. Ahern; James W. Mitchell

[57] ABSTRACT

A method is disclosed for metallurgically bonding a protective sheet cladding to a convex-concave substrate such as an airfoil or turbine blade. According to the method of the invention, a preassembled sheet cladding and substrate is masked at all seams. The masked assembly is then placed in a deformable container with the remaining volume filled with glass chips. The container is thereafter outgassed and sealed air-tight. The container is then placed in a hot gas autoclave for diffusion bonding. During the diffusion bonding step, the glass melts and the container deforms thereby ensuring an isostatic stress state. The bonded clad-substrate is subsequently removed from the container for final cleaning.

9 Claims, 3 Drawing Figures

CLADDING
BONDLINE
SUBSTRATE

250X

SHEET CLADDING METHOD

BACKGROUND OF THE INVENTION

This invention was made under contract with the United States Government, Maritime Administration of the Department of Commerce, Contract 0-35510. The U.S. Government is licensed in accordance with the terms of the aforesaid contract and has reserved the rights set forth in Sections 1(f) and 1(9) of the Oct. 10, 1963 Presidential Statement of Government Patent Policy.

In general, this invention relates to a method of bonding a sheet metal cladding to an alloy substrate; and, in particular, this invention relates to a method of metallurgically bonding an oxidation and hot corrosion-resistant sheet cladding to a structural alloy of the type having convex-concave surfaces such as an airfoil employed as a nozzle or blade in a gas turbine.

The surface instability of structural superalloy substrates looms as a significant problem for advanced industrial, aircraft, and marine gas turbines. Highly corrosive environments are generated by the combustion of heavy fuel oils, and when this is combined with higher firing temperatures and longer maintenance intervals, some very strict limitations arise in materials selection. Additionally, further corrosive elements may be introduced in marine turbine applications due to sea salt ingestion. It has become increasingly difficult to generate both high creep-rupture strength and good corrosion resistance through alloy modification to the base metal alone due to complex interactions between the elements which generally favor one property at the sacrifice of the other. Various coating and cladding schemes have been developed, the aims of which are to provide surface protection to an otherwise strong superalloy substrate. The bonding of an oxidation and hot corrosion-resistant sheet cladding to a blade or nozzle substrate represents one solution to the surface instability problem.

U.S. Pat. No. 3,699,642 issued Oct. 24, 1972 to Lange describes a method of applying a sheet cladding to a convex-concave substrate. According to the patent, a preformed sheet metal cladding is mounted on a convex-concave substrate. The cladding-substrate assembly is put into a pressure chamber and the assembly is surrounded by a powder of metal oxides to be used as a pressure transmitting medium. Thereafter head and pressure are applied to the assembly through the powdered metal oxide pressure transmitting medium by an axially loaded pressing device. It should be noted that hot gas isostatic pressing methods are specifically mentioned as being disadvantageous and that the powdered pressure transmitting medium is a metal oxide which is non-densifying.

In U.S. patent application Ser. No. 513,853 to Beltran and Dybas filed Oct. 10, 1974 and assigned to the assignee of the present invention, another method of bonding a sheet cladding to a convex-concave substrate is disclosed. Briefly described, the method comprises the steps of: preforming a sheet cladding to a substrate so that the cladding closely conforms to the substrate concave and convex surfaces; evacuating the space between the cladding and substrate; vacuum brazing all seams between the cladding sheet and substrate; and, diffusion bonding the cladding to the substrate using hot gas isostatic pressure. It was found in the practice of Beltran-Dybas method that the evacuating-vacuum brazing steps caused a pressure differential to be created at the clad-substrate interface which resulted in the cladding sheet being drawn into the substrate convex-concave surfaces after the cladding-substrate assembly was withdrawn from the vacuum furnace and prior to the diffusion bonding step. The foregoing evacuation-vacuum brazing steps were of great advantage in enhancing the effect of the diffusion bonding step.

The present invention provides an alternative method to the foregoing Beltran-Dybas invention wherein the vacuum brazing step is obviated. Vacuum brazing is time-consuming in terms of heating and cooling the clad-substrate assembly. Moreover, the vacuum brazing step requires great care to assure that no leaks are present between the cladding and substrate. Furthermore, it should be noted that in a substrate of complex shape, the difficulties of the vacuum brazing step are further increased.

It is therefore one object of the present invention to provide an improved method of diffusion bonding a sheet cladding to a convex-concave substrate.

It is another object of the present invention wherein the foregoing objects of the invention are carried out without the use of a vacuum brazing step.

The novel features believed characteristic of the present invention are set forth in the appended claims. The invention itself, however, together with further objects and advantages thereof, may best be understood with reference to the following description, taken in connection with the drawings.

BRIEF DESCRIPTION OF THE INVENTION

The method according to the present invention is carried out by preforming a sheet cladding to a substrate and masking the seams formed between the cladding and the substrate. Thereafter the cladding-substrate assembly is inserted into a deformable container wherein the assembly is completely immersed in a granular densifying pressure transmitting medium. The pressure transmitting medium preferably is comprised of glass beads or chips which become molten during the diffusion bonding step. The deformable container including the cladding-substrate assembly and pressure transmitting medium is outgassed and sealed. Thereafter the container and its contents are subjected to a programmed time-temperature hot gas isostatic pressure cycle during the diffusion bonding step.

DETAILED DESCRIPTION OF THE INVENTION

Figure 1:
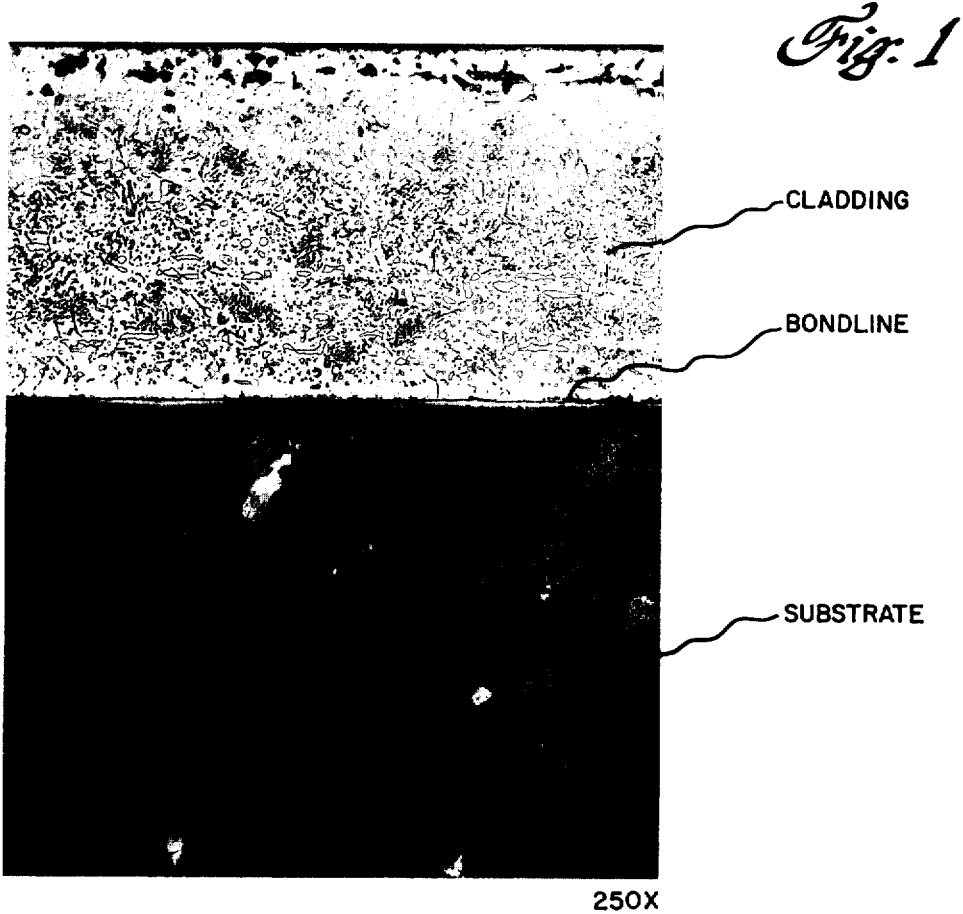
FIG. 1 is a photograph showing the bondline structure of a Ni-50Cr sheet cladding bonded to an IN738B substrate formed according to the present invention.

The sheet cladding and substrate are thoroughly cleaned prior to the practice of the present invention to remove constituents detrimental to diffusion bonding. The interfacing surfaces of the cladding and substrate can, for example, be provided with a thin nickel plate or strike and subjected to a vacuum heat treatment. Other steps may be taken such as surface abrasion, grinding or vacuum outgassing. Thereafter, the sheet cladding is assembled to the substrate so that the sheet cladding closely conforms to the shape of the substrate. One method of assembling the sheet cladding to the substrate is disclosed in U.S. patent application Ser. No. 513,852 to Schilling and Beltran filed Oct. 10, 1974 and assigned to the assignee of the present invention and incorporated herein by reference. Briefly described, the method of the Schilling and Beltran application comprises the steps of: rough forming the sheet cladding to the substrate so that the sheet cladding closely abuts the convex surface of the substrate while the sheet cladding opposite the concave surface of the substrate is spaced from the concave surface; placing the sheet cladding and substrate assembly in a sealed rubbery mold; and, applying isostatic pressure to the mold to deform the sheet cladding into contact with the substrate concave surface.

After the sheet cladding and substrate are assembled, the assembly is further prepared by masking all seams which are defined between the cladding sheet and substrate to prevent penetration by the pressure transmitting medium into the interface between the cladding and substrate. The masking step may be carried out by taping the seams or by tack welding the cladding sheet to the substrate along the seams. Brazing is another method which could be used during the masking step. All that is required is that some step be taken to keep the pressure transmitting medium, whether it is in the solid or molten state, from entering the clad-substrate interface.

The masked assembly is then inserted into a deformable metal container (mild steel) which will collapse under pressures consistent with diffusion bonding. The volume of the deformable container is such that the clad-substrate assembly may be completely immersed in a granular, densifying pressure transmitting medium with sufficient clearances provided about the assemby edges such that during the diffusion bonding process using hot gas isostatic pressing none of the assembly edges will pierce the container under collapse. Glass beads or chips are preferred as a pressure transmitting medium because the glass will densify and become molten at diffusion bonding temperatures to provide an optimum hydrostatic pressure transmitting medium. Moreover, glass is relatively inert, easily outgassed and can be easily removed from the surface of the assembly after the diffusion bonding step.

After the deformable container is filled with both the masked cladding-substrate assembly and the pressure transmitting medium, the next step comprises sealing the container after it has been outgassed. This is accomplished by hot evacuation of the entire assembly followed by a forge-weld seal-off from the vacuum system.

The sealed container is put into a hot gas autoclave (hot isostatic press) for diffusion bonding at appropriate temperatures and pressures. See, for example, FIG. 3 which shows a time-temperature-pressure curve for a typical bonding cycle. During the diffusion bonding step the glass beads will liquify (become viscous) and the subsequent volume change causes the deformable container to partially collapse about the clad-substrate assembly ensuring an isostatic stress state to exist about the assembly. Temperatures and pressures used during the diffusion bonding step are dependent upon the materials which are bonded. However, considerable care is taken to avoid high pressures (> 1 KSI) before the pressure transmitting medium has softened. Application of high pressure before the glass chips have softened can cause a poor surface finish.

Figure 2:
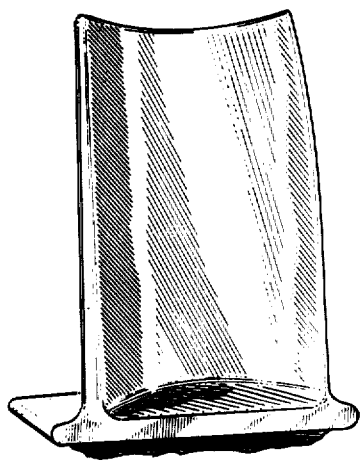
FIG. 2 is a drawing of an airfoil structure formed in accordance with the steps of the present invention.

After the diffusion bonding step, the clad-substrate assembly is removed from the deformable container and glass which has adhered to the surfaces of the bonded clad-substrate assembly is removed by sandblasting or by subsequent vacuum heating and water quenching of the assembly. Thereafter, the bonded clad-substrate assembly may be subjected to a final heat treatment, if required. The bondline structure of a clad-substrate assembly after difusion bonding is shown in FIG. 1; whereas, the final product after cleaning is shown in FIG. 2.

EXAMPLE

An IN738B convex-concave substrate in a machined and heattreated condition was chemically cleaned using an $HF/HNO_3$ solution and then given a thin (0.0004 – 0.001 inch) nickel plate (strike). The dimension of the portion to be clad was about 2½ inch width at the base and having a height of about 3½ inches. The plated part was then given a 2050°F/1 hr. vacuum anneal to ensure good adhesion of the Ni plate to the IN738B substrate. A cladding blank of Ni-50Cr alloy, approximately 10 mils in thickness was made. The sheet cladding was cleaned with fine grit emery paper and rinsed in acetone. The sheet cladding was then preformed to the convex-concave substrate using the Schilling-Beltran method outlined in U.S. patent application Ser. No. 513,852. Considerable care was taken to avoid contamination of the interface surfaces.

After the sheet cladding was preformed to the substrate, masking of all seams (to prevent molten glass penetration) was accomplished by the application of tantalum foil (about 5 mils in thickness). Tantalum was chosen for the masking material because of its low tendency to react or interdiffuse with the cladding-substrate assembly. The tantalum masking was spot-welded to the assembly seams to ensure complete enclosure of the seams.

A mild steel deformable container approximately 7½ × 4½ × 1¾ inches was fabricated by welding and subsequently glass blasting was used to produce a clean interior. Borosilicate glass "cull" or chips was used as the pressure transmitting medium. Borosilicate glass was chosen for this application because of its high viscosity at the bonding temperature, thus reducing the possibility of glass penetration. Approximately 1 inch of 4–6 mesh chips was poured into the "mild" steel container and then the cladding-substrate assembly was placed in the container. The remaining volume was vibration-filled with additional chips. A top cover to the container and evacuation tube was welded in place and the container was vacuum leak tested on a helium mass spectrometer leak detector. The container and its contents were evacuated at 600°F for 16–20 hours until a static outgassing rate of less than 30 $\mu$ m Hg/hr. was attained. At this point, the assembly was sealed off, under vacuum, using a forged welding technique.

Figure 3:
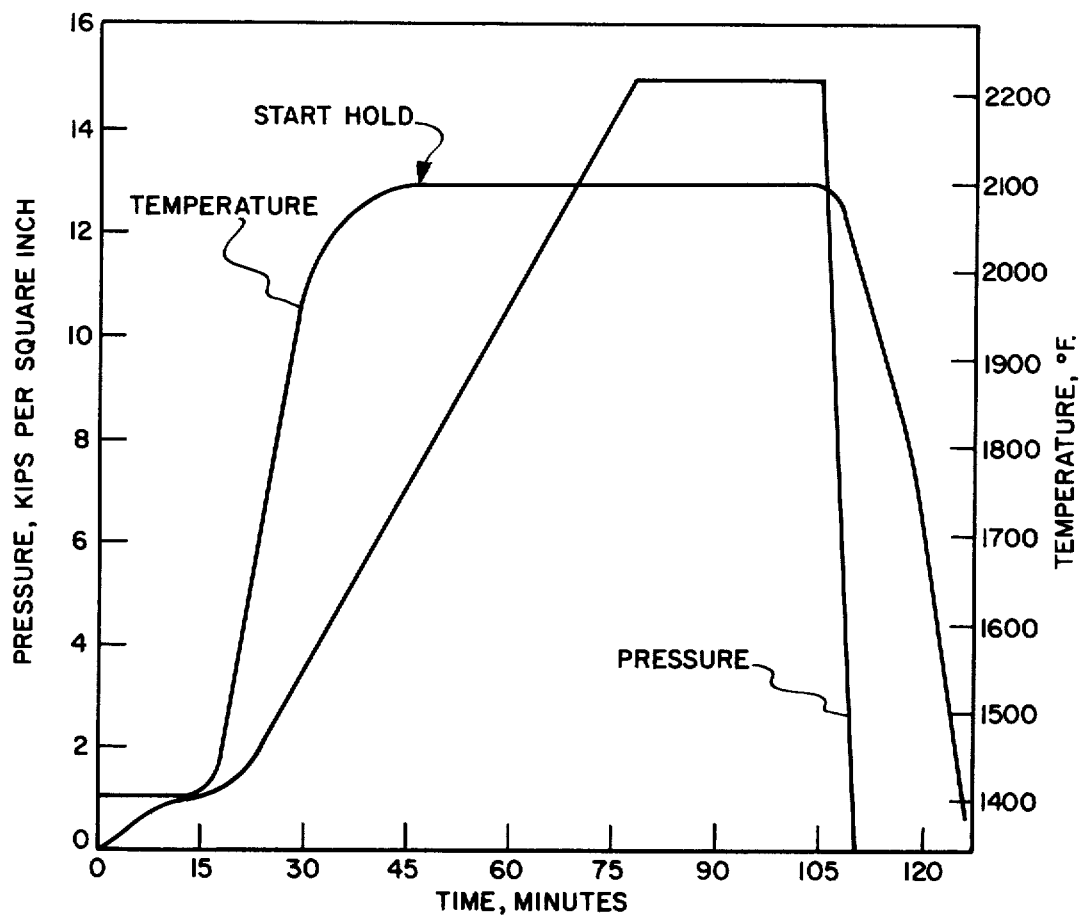
FIG. 3 is a graph showing typical pressure-temperature-time curves for the diffusion bonding step.

Diffusion bonding was performed in a hot gas autoclave (hot isostatic press) in accordance with the pressure-temperature-time curve shown in FIG. 3. Note that the diffusion bonding cycle is initiated with the autoclave preheated to approximately 1400°. At 1400°F, the glass cull becomes soft and hence pressure may be thereafter applied without marring the surface finish of the assembly. The temperature and pressure are increased to about 2100°F and 15 KSI for about 30 minutes to ensure diffusion bonding and thereafter the temperature is rapidly decreased to prevent interdiffusion of the parts.

As the glass becomes molten, the change in state causes the container to collapse from the applied external pressure. The densifying glass causes intimate contact between the substrate and cladding within the container ensuring a true isostatic stress state in the container. At the completion of the diffusion bonding step, the container is removed from the autoclave and water quenched from about 1600°–1700°F. Quenching acts to fracture the glass for easy removal of the assembly from the container and also maintains a relatively high cooling rate to preserve the substrate properties.

Final removal of adherent glass was accomplished by a combination of sandblasting and dissolution of glass in concentrated HF. Belt abrading was used for final surface finishing. FIG. 1 shows the bondline structure of the clad-substrate after bonding. FIG. 2 shows the bonded clad-substrate exterior.

While there has been shown what is considered to be the preferred embodiment of the present invention, other modifications may occur to those skilled in the art; and, it is intended to cover in the appended claims all such modifications as fall within the true spirit and scope of the invention.

What is claimed is:

1. A method of applying a sheet cladding to a structural substrate, said method comprising the steps of:
   a. assembling the sheet cladding to the substrate so that the cladding closely conforms to the substrate;
   b. masking the seams between the cladding and substrate;
   c. placing the cladding-substrate assembly into a deformable container;
   d. filling the container with a pressure transmitting medium so as to completely immerse the cladding-substrate assembly therein;
   e. sealing the container so that it is air-tight;
   f. applying hot gas isostatic pressure to the exterior surfaces of the container for diffusion bonding the cladding to the substrate; and,
   g. removing the diffusion bonded sheet-cladding assembly from the container.

2. The method recited in claim 1 wherein the substrate includes concave-convex surfaces and wherein the assembling step further comprises:
   a. rough forming the sheet cladding to the substrate so that the cladding sheet portion adjacent the convex surface of the substrate closely abuts the convex surface and the cladding sheet portion adjacent the concave surface of the substrate is spaced from the concave surface;
   b. placing the sheet cladding and substrate assembly in a sealed rubbery mold;
   c. applying isostatic pressure to the mold to deform the sheet cladding into contact with the substrate concave surface; and,
   d. removing the assembled cladding substrate from the mold.

3. The method recited in claim 1 wherein the masking step comprises the steps of:
   a. taping the seams of the cladding substrate assembly to prevent the incursion of foreign matter in the clad-substrate interface.

4. The method recited in claim 1 wherein the pressure transmitting medium comprises granular particles which will densify and become molten during the application of hot isostatic pressure.

5. The method recited in claim 1 wherein the pressure transmitting medium comprises glass chips.

6. The method recited in claim 1 wherein the sealing step further includes outgassing the container prior to sealing the container.

7. The method recited in claim 1 wherein the step of applying hot gas isostatic pressure further comprises the steps of:
   a. applying heat without pressure until the pressure transmitting medium becomes soft;
   b. gradually raising the temperature and pressure for diffusion bonding the cladding to the substrate; and,
   c. rapidly decreasing the temperature to limit interdiffusion between the cladding and substrate after the diffusion bonding cycle.

8. The method recited in claim 1 further comprising the steps of cleaning and polishing the cladding-substrate assembly after it has been removed from the container.

9. A method of diffusion bonding a metal sheet cladding to a convex-concave metal substrate, said method comprising the steps of:
   a. assembling the sheet cladding to the substrate so that the cladding closely conforms to the substrate;
   b. masking the seams between the cladding and substrate;
   c. placing the cladding-substrate assembly into a deformable metal container;
   d. filling the container with a pressure transmitting medium so as to completely immerse the cladding-substrate assembly therein;
   e. outgassing and sealing the container;
   f. heating the container until the pressure transmitting medium becomes viscous;
   g. gradually applying hot gas isostatic pressure to the exterior surfaces of the container for diffusion bonding the cladding to the substrate;
   h. rapidly decreasing the temperature after the diffusion bonding cycle; and,
   i. removing the bonded cladding-substrate assembly from the container for subsequent cleaning and polishing.

* * * * *